United States Patent [19]

Lindgren et al.

[11] Patent Number: 4,524,930
[45] Date of Patent: Jun. 25, 1985

[54] INFLATION-CONTROLLED PARACHUTE

[75] Inventors: Matts J. Lindgren; Murl F. Culp, both of Cupertino, Calif.

[73] Assignee: Lockheed Missiles & Space Co., Inc., Sunnyvale, Calif.

[21] Appl. No.: 505,301

[22] Filed: Jun. 17, 1983

[51] Int. Cl.³ ............................................. B64D 17/36
[52] U.S. Cl. .................................................... 244/152
[58] Field of Search ....................... 244/152, 150, 142

[56] References Cited

U.S. PATENT DOCUMENTS

| | | | |
|---|---|---|---|
| 2,520,931 | 9/1950 | Heinrich | 244/152 |
| 3,887,151 | 6/1975 | Matsuo | 244/152 |
| 4,279,392 | 7/1981 | Saxton | 244/150 |

FOREIGN PATENT DOCUMENTS

| | | | |
|---|---|---|---|
| 714407 | 8/1954 | United Kingdom | 244/152 |
| 912299 | 12/1962 | United Kingdom | 244/152 |

Primary Examiner—Galen Barefoot
Attorney, Agent, or Firm—John J. Morrissey

[57] ABSTRACT

An inflation-controlled parachute comprises an extended flexible structure (10) for providing an aerodynamic drag-producing surface, and an inflation-control line (20) for controlling the rate at which the flexible structure (10) unfolds from a stowed configuration to an inflated configuration. One end of the inflation-control line (20) is secured to the flexible structure (10), and the remainder of the inflation-control line (20) is threaded through positioning rings (22) attached to the flexible structure (10) so that one segment of the inflation-control line (20) overlies another segment thereof in frictional engagement therewith. Frictional engagement of the two segments of the inflation-control line (20) occurs as the flexible structure (10) inflates, thereby controlling the rate of inflation of the flexible structure (10).

6 Claims, 5 Drawing Figures

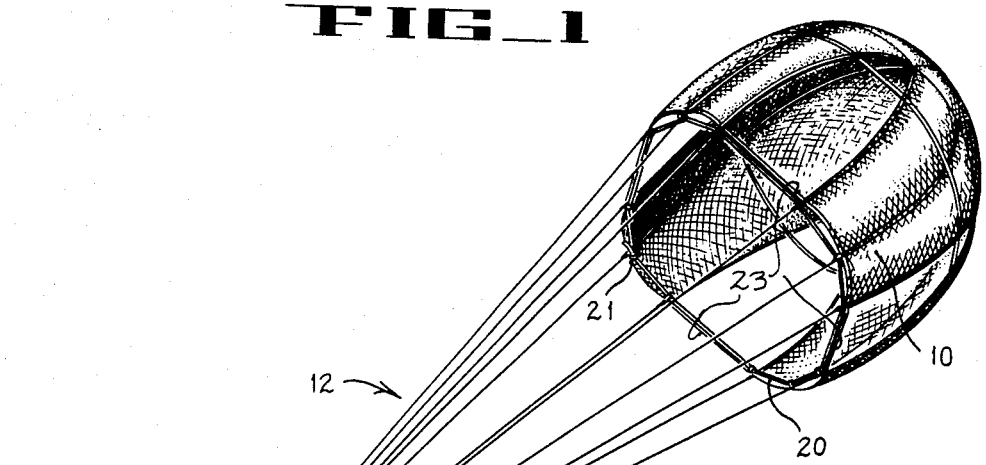
FIG_1
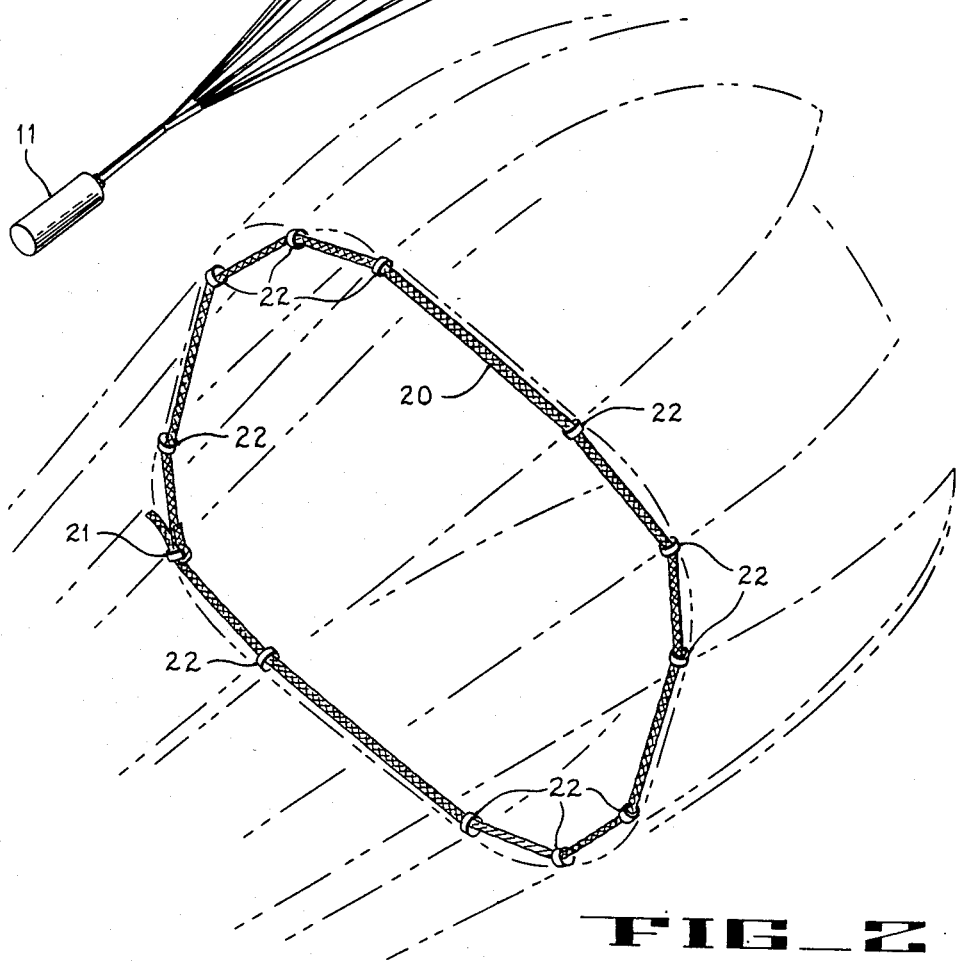
FIG_2

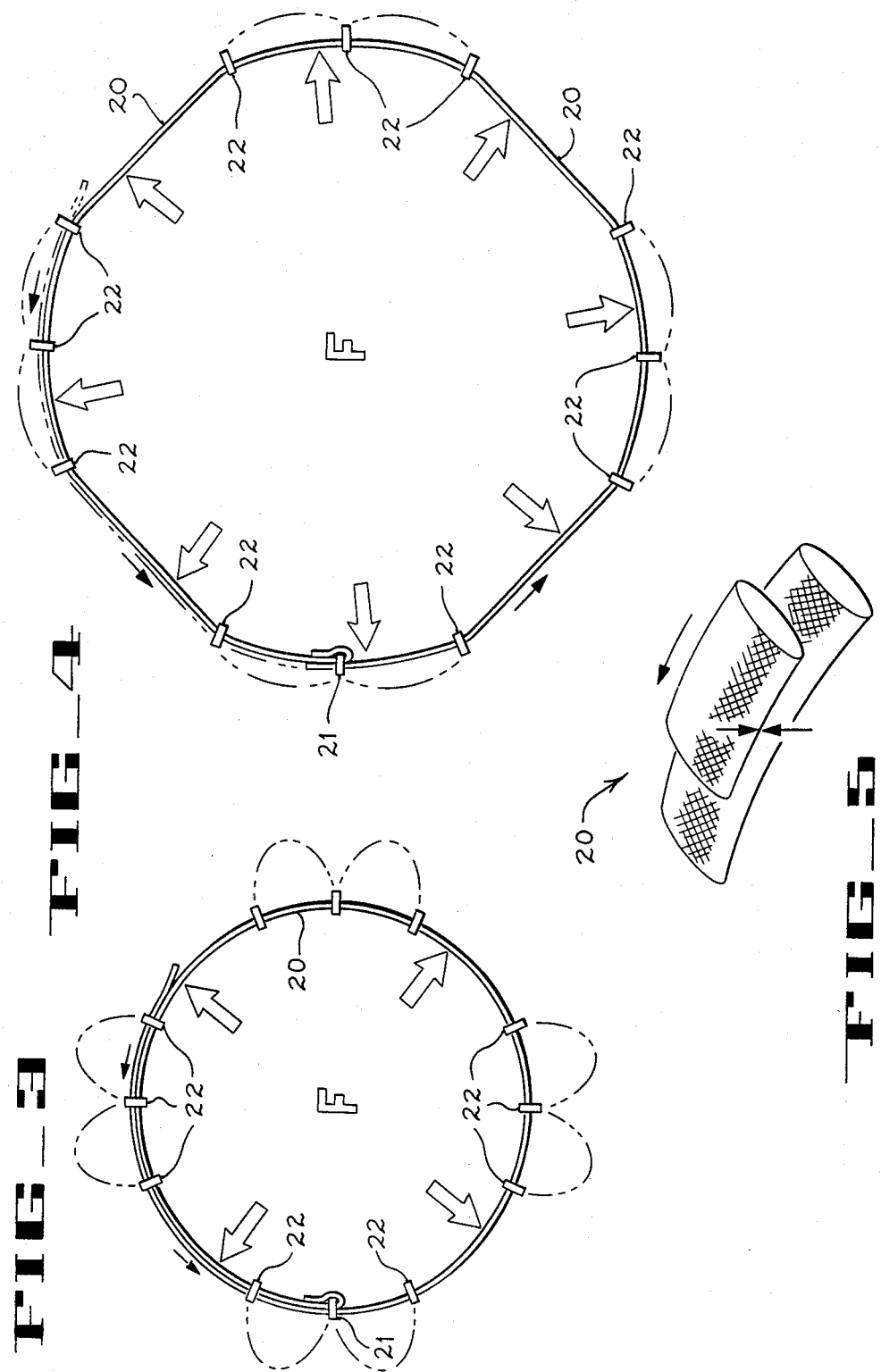

INFLATION-CONTROLLED PARACHUTE

The Government has rights in this invention pursuant to Contract FO8635-80-C- 0273 awarded by the Department of the Air Force.

TECHNICAL FIELD

This invention relates to inflation control techniques for parachutes.

DESCRIPTION OF THE PRIOR ART

A parachute generally comprises some type of flexible structure, which is attached by suspension lines to a payload. The flexible structure, when inflated, provides an aerodynamic drag-producing surface that retards motion of the payload through the atmosphere or water. The greatest stresses exerted on the flexible structure of a parachute are attributable to so-called opening forces, which are forces of short duration that occur on inflation of the flexible structure.

The opening forces that occur upon rapid inflation of the flexible structure of a parachute from a stowed (i.e., folded) configuration to an inflated (i.e., unfolded) configuration cause an opening shock, which if too large could tear and destroy the flexible structure. It was recognized in the prior art that the opening forces acting on a parachute flexible structure can be reduced by slowing the rate at which inflation of the flexible structure takes place.

Various types of explosive devices (called pyrotechnic reefing controls) were available in the prior art for causing the flexible structure of a parachute to inflate in controlled stages. Pyrotechnic reefing controls were generally used to actuate electrical or mechanical cutters, which caused incremental portions of the parachute flexible structure to inflate in sequence. However, pyrotechnic reefing controls used in the prior art were characteristically bulky and costly. Furthermore, pyrotechnic reefing controls and associated cutters used in the prior art were susceptible to bending and/or crushing especially at high parachute packing pressures, and were therefore often less than fully reliable in operation.

SUMMARY OF THE INVENTION

It is an object of the present invention to provide a parachute inflation control technique whereby the flexible structure that provides the aerodynamic drag-producing surface of the parachute can be inflated continuously and in a controlled manner.

It is a particular object of the present invention to provide a parachute inflation control technique that operates without explosives and without electrical or mechanical cutting devices.

It is likewise an object of the present invention to provide a technique whereby the rate at which the flexible structure of a parachute is inflated can be reliably controlled using only relatively simple mechanical means.

A parachute in accordance with the present invention comprises an extended flexible structure for providing an aerodynamic drag-producing surface, and an inflation control means for enabling the flexible structure to unfold from a stowed configuration into an inflated configuration at a controlled and continuous rate.

The flexible structure of a parachute according to the present invention may be of conventional canopy configuration or otherwise, and serves to retard the motion (i.e., the forward motion and/or the descent) of a payload attached to the parachute when deployed. The inflation control means is the distinguishing feature of a parachute according to the present invention, and comprises a flexible inflation-control line, one end of which is secured to the flexible structure, and the other end (i.e., the free end) of which is threaded through positioning devices such as rings that are attached to the flexible structure so that one segment of the inflation-control line overlies another segment of the inflation-control line when the flexible structure is in the stowed configuration.

Upon deployment of the parachute of the present invention, the free-end of the inflation-control line becomes unthreaded from the positioning devices as the flexible structure unfolds into the inflated configuration. Frictional engagement between two overlapping segments of the inflation-control line occurs as the inflation-control line becomes unthreaded from the positioning devices. This frictional engagement between the two overlapping segments of the inflation-control line provides resistance to inflation of the flexible structure, thereby controlling the rate at which the flexible structure can be inflated.

DESCRIPTION OF THE DRAWING

FIG. 1 is a perspective view of an inflation-controlled parachute according to the present invention.

FIG. 2 is a portion of the perspective view of FIG. 1 emphasizing the inflation-control line of the parachute of FIG. 1.

FIG. 3 is a plan view of the inflation-control line of the parachute of FIG. 1 at an initial stage of the inflation of the flexible structure of the parachute.

FIG. 4 is a plan view of the inflation-control line of the parachute of FIG. 1 after full inflation of the flexible structure of the parachute has occurred.

FIG. 5 schematically illustrates frictional engagement of one segment of the inflation-control line with another segment of the inflation-control line during inflation of the parachute of FIG. 1.

BEST MODE FOR CARRYING OUT THE INVENTION

FIG. 1 illustrates a parachute according to the present invention after having been deployed from a delivery vehicle. The parachute comprises an extended flexible structure 10 to which a payload 11 is secured by means of suspension lines 12. The flexible structure 10 could be of conventional configuration or otherwise.

Upon deployment, the flexible structure 10 begins to unfold from a stowed configuration to an inflated configuration so as to provide an aerodynamic drag-producing surface for retarding the motion of the payload 11. In a typical embodiment of the invention, the flexible structure 10 unfolds into a canopy of generally dome-like configuration having a generally circular periphery to which proximal ends of the suspension lines 12 are attached. In the embodiment illustrated in FIG. 1, the flexible structure 10 is configured with four symmetrically arranged leg portions extending from a dome-like central portion, and the proximal ends of the suspension lines 12 are attached to the leg portions adjacent the periphery thereof by a conventional technique. The particular configuration of the flexible structure 10 is not critical to the present invention.

Ordinarily, the flexible structure 10 would be made of synthetic material such as nylon. The suspension lines 12 are conventionally nylon cords. However, the materials from which the flexible structure 10 and the suspension lines 12 are made are not critical to the present invention. Distal ends of the suspension lines 12 are secured to the payload 11 by conventional means.

The parachute, upon deployment from the delivery vehicle, initially assumes an extracted configuration. In accordance with present invention, an inflation-control line 20 is secured to the flexible structure 10 of the parachute in such a way as to control the rate at which the flexible structure 10 can unfold from the extracted configuration into the inflated configuration. As shown in FIG. 2, one end of the inflation-control line 20 is secured to a fastening device such as a ring 21 that is attached to the flexible structure 10 preferably on the inside surface of a leg portion adjacent the periphery thereof. Positioning devices such as rings 22 are likewise secured to the flexible structure 10 preferably on the inside surface of the various leg portions adjacent the periphery thereof.

The free end of the inflation-control line 20 is threaded through the various positioning rings 22 in sequence. In the view shown in FIG. 2, the inflation-control line 20 has been threaded through the positioning rings 22 in a clockwise manner from the fastening ring 21. When the flexible structure 10 is folded in the stowed configuration, the inflation-control line 20 completes a full circuit through the positioning rings 22 so as to be inserted again through (but without being fastened to) the fastening ring 21, and so as to be inserted a second time through several of the positioning rings 22 in sequene. Thus, one segment of the inflation-control line 20 overlies another segment thereof when the flexible structure 10 is folded in the stowed configuration. These segments of the inflation-control line 20 are in overlapping frictional engagement with each other.

FIG. 3 shows the overlapping engagement of one segment of the inflation-control line 20 with another segment thereof at an initial stage of the inflation of the flexible structure 10 following deployment of the parachute from the delivery vehicle. Opening forces (indicated by the vectors F in the drawing), which occur as the flexible structure 10 begins to inflate, cause the flexible structure 10 to billow and thereby cause the leg portions of the flexible stucture 10 to spread apart. This spreading of the leg portions of the flexible structure 10 causes the free end of the inflation-control line 20 to travel so as to unthread itself through the positioning rings 22 until the flexible structure 10 reaches a state of full inflation. If the flexible structure 10 were configured without distinct leg portions, but rather were to have a continuous periphery, the periphery would expand outward as the flexible structure 10 billows during the inflation process, and the free end of the inflation-control line 20 would in the same manner unthread itself through the positioning rings 22.

As shown in FIG. 1, an over-flation tape 23 is secured to the flexible stucture 10 circumjacent the periphery thereof to limit the maximum spread of the periphery of the flexible structure 10. Where the flexible structure 10 has distinct leg portions as shown in the drawing, the over-inflation tape 23 crosses the gap between adjacent leg portions. The inflation-control line 20 runs generally abreast of the over-inflation tape 23 in the type of parachute shown in FIG. 1. However, for many applications there is no need for an over-inflation tape.

FIG. 4 shows the inflation-control line 20 after the flexible structure 10 has reached the state of full inflation. The inflation-control line 20 is long enough so as to remain threaded through the fastening ring 21 when full inflation of the flexible structure 10 has been attained.

Frictional engagement of the overlapping segments of the inflation-control line 20 during inflation of the flexible structure 10, as illustrated schematically in FIG. 5, provides resistance to the inflation of the flexible structure 10. Control of the rate of inflation of the flexible structure 10 is provided by making the inflation-control line 20 from a material having an appropriate coefficient of friction, and by selecting an appropriate length of overlap between the segments of the inflation-control line 20, i.e., by selecting the number of positioning rings 22 through which the free end of the inflation-control line 20 is threaded.

The essential feature of the present invention is that the inflation-control line 20 encounters frictional resistance as the flexible structure 10 begins to inflate, and that this frictional resistance controls the rate of inflation of the flexible structure 10. In the preferred embodiment, this frictional resistance is provided by disposing the inflation control line 20 so that two segments thereof are in frictional engagement with each other during the inflation process. In an alternative embodiment of the invention, the inflation-control line 20 could be disposed so as to be in frictional engagement with, e.g., a designated rough surface portion of the aerodynamic drag-producing surface of the flexible structure 10 during the inflation process.

Particular embodiments of an inflation-controlled parachute in accordance with the present invention have been described herein. Other embodiments suitable for particular applications would become apparent to workers skilled in the art upon perusal of the foregoing specification and accompanying drawing. Thus, the description presented herein is to be understood as illustrative of the invention, which is more generally defined by the following claims and their equivalents.

We claim:

1. A parachute comprising:
(a) a flexible structure that is foldable into a stowed configuration, said flexible structure being unfoldable from said stowed configuration into an inflated configuration so as to provide an aerodynamic drag-producing surface, and
(b) inflation control means for enabling said flexible structure to unfold from said stowed configuration into said inflated configuration at a controlled rate, said inflation control means including:
   (i) a plurality of positioning rings attached to said flexible structure, and
   (ii) a flexible inflation-control line, a first portion of said line being affixed to said flexible structure and a second portion of said line being threaded through said positioning rings, said second portion of said line moving relative to said first portion of said line when said flexible structure unfolds into said inflated configuration, one segment of said second portion of said line overlying another segment of said second portion of said line within at least one of said positioning rings, said one segment being in frictional engagement with said other segment when said second portion of said line moves relative to said first portion of said line, said frictional engagement of said segments of said second portion of said line providing frictional resistance for controlling the rate at which said flexible structure unfolds into said inflated configuration.

2. The parachute of claim 1 wherein said first portion of said inflation-control line is an end portion of said line.

3. The parachute of claim 2 wherein said end portion of said inflation-control line is attached to said aerodynamic drag-producing surface of said flexible structure, and wherein said positioning rings are attached to said aerodynamic drag-producing surface.

4. The parachute of claim 2 wherein said end portion of said inflation-control line is secured to a fastening ring, said fastening ring being secured to said flexible structure.

5. The parachute of claim 4 wherein said second portion of said inflation-control line is threaded through said positioning rings and also through said fastening ring, whereby said one segment of said second portion of said line is positioned by said fastening ring and by at least one of said positioning rings so as to overlie said other segment of said second portion of said line when said flexible structure is in said stowed configuration.

6. The parachute of claim 5 wherein said fastening ring and said positioning rings are attached to a peripheral portion of said aerodynamic drag-producing surface of said flexible structure.

* * * * *